United States Patent
Binek et al.

(10) Patent No.: US 12,313,001 B2
(45) Date of Patent: May 27, 2025

(54) SUPPORT STRUCTURE FOR BEARING COMPARTMENT

(71) Applicant: RTX Corporation, Farmington, CT (US)

(72) Inventors: Lawrence A. Binek, Glastonbury, CT (US); Christopher D. Ramsey, Glastonbury, CT (US); Benjamin G. Gardell, Bristol, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/496,079

(22) Filed: Oct. 27, 2023

(65) Prior Publication Data

US 2024/0151181 A1  May 9, 2024

Related U.S. Application Data

(60) Provisional application No. 63/423,279, filed on Nov. 7, 2022.

(51) Int. Cl.
F02C 7/06 (2006.01)

(52) U.S. Cl.
CPC ........................ F02C 7/06 (2013.01)

(58) Field of Classification Search
CPC .......... F02C 7/06; F01D 25/162; B22F 10/47; B22F 10/40
See application file for complete search history.

(56) References Cited

U.S. PATENT DOCUMENTS

| | | |
|---|---|---|
| 9,539,764 B2 | 1/2017 | Soucy et al. |
| 9,933,017 B2 * | 4/2018 | Long ........................ F16C 27/04 |
| 10,138,757 B2 * | 11/2018 | Witlicki ................ F16C 27/045 |
| 10,563,580 B2 * | 2/2020 | Harral ........................ F02C 7/06 |
| 11,186,034 B2 | 11/2021 | Vial et al. |
| 11,273,603 B2 | 3/2022 | Robichaud |
| 11,401,050 B2 | 8/2022 | Carberry et al. |
| 2013/0280063 A1 * | 10/2013 | Ganiger ................ F01D 25/164 415/229 |
| 2019/0309629 A1 | 10/2019 | Fraser et al. |
| 2020/0346413 A1 | 11/2020 | Binek et al. |
| 2021/0008624 A1 | 1/2021 | Ovaere et al. |
| 2021/0016498 A1 | 1/2021 | Ovaere et al. |
| 2021/0033003 A1 | 2/2021 | Ovaere et al. |

FOREIGN PATENT DOCUMENTS

| | | |
|---|---|---|
| DE | 102017101835 A1 | 8/2018 |
| EP | 3791976 A1 | 3/2021 |
| EP | 3524782 B1 | 6/2021 |
| FR | 3118891 A1 | 7/2022 |
| WO | 2023047055 A1 | 3/2023 |

OTHER PUBLICATIONS

Partial SR Issued Mar. 28, 2024; 14 pages.
Extended European Search Report corresponding to EP Application No. 23207928.5; Issued Date, Jul. 17, 2024, 16 pages.

* cited by examiner

*Primary Examiner* — Thuyhang N Nguyen
(74) *Attorney, Agent, or Firm* — CANTOR COLBURN LLP

(57) ABSTRACT

According to an aspect, a support structure is integrally formed with a bearing compartment. The support structure includes a plurality of vertical supports and horizontal supports. The vertical supports and horizontal supports include one or more features to support machining of the bearing compartment and removal of the support structure from the bearing compartment.

20 Claims, 5 Drawing Sheets

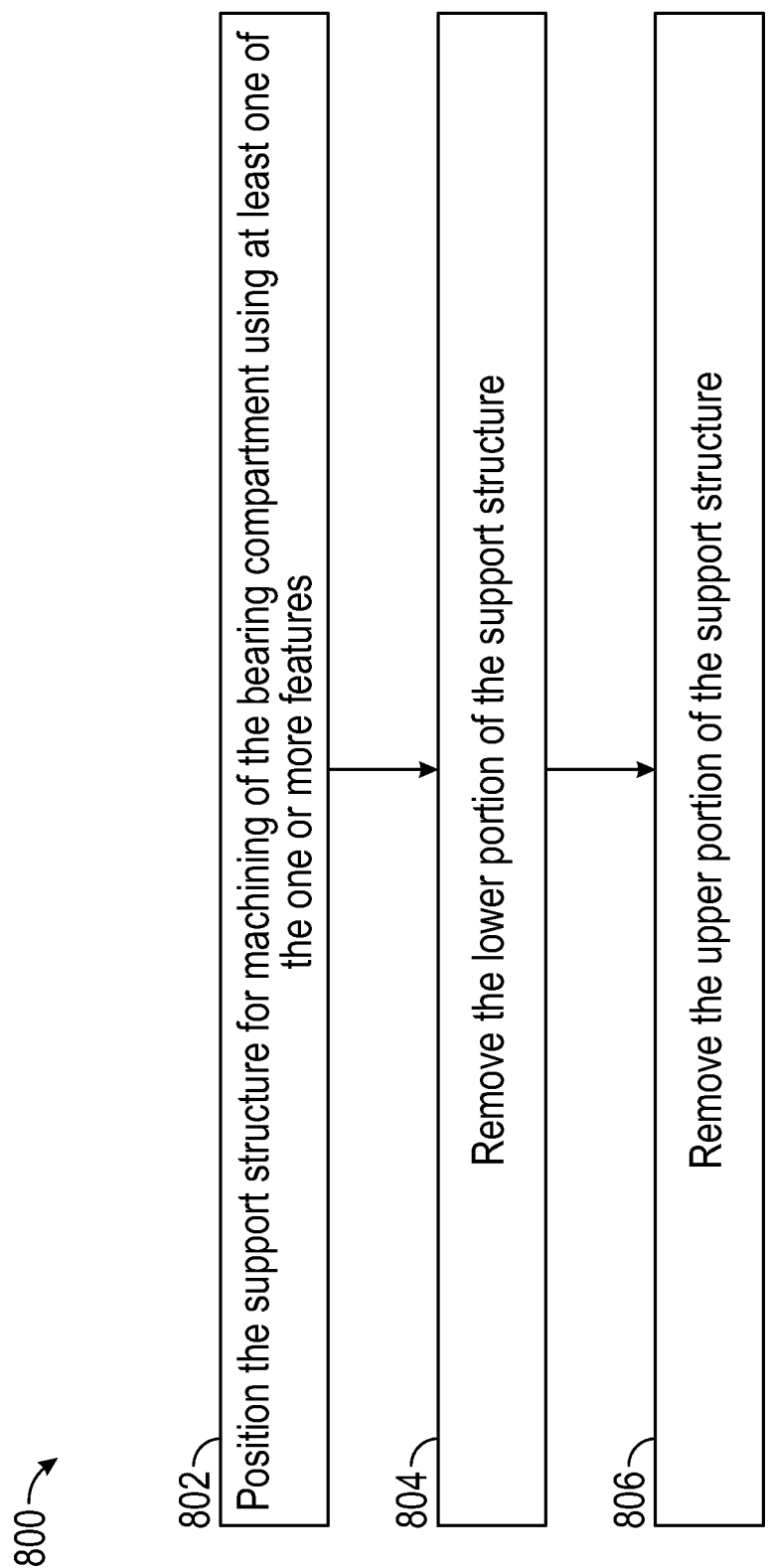

SUPPORT STRUCTURE FOR BEARING COMPARTMENT

CROSS-REFERENCE TO RELATED APPLICATIONS

This application claims the benefit of U.S. Provisional Application No. 63/423,279 filed Nov. 7, 2022, the disclosure of which is incorporated herein by reference in its entirety.

BACKGROUND

Exemplary embodiments of the present disclosure relate generally to gas turbine engines and, in one embodiment, to a support structure manufactured in a bearing compartment of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotation of a propeller/fan or to produce electricity in a generator.

Certain parts, such as a bearing compartment, in a gas turbine engine can include complex geometry. For example, a bearing compartment may include multiple overhang regions that have different radial dimensions. When components are created through an additive manufacturing process, such as through powder bed fusion, support structures are needed to support overhangs and other features having complex geometry. The support structures can be designed by modeling tools to include minimum support for later removal. The suggestions generated by tools are based on component geometry and do not consider the use or assembly aspects of the component.

BRIEF DESCRIPTION

According to an aspect, a support structure is integrally formed with a bearing compartment. The support structure includes a plurality of vertical supports and horizontal supports. The vertical supports and horizontal supports include one or more features to support machining of the bearing compartment and removal of the support structure from the bearing compartment.

In addition to one or more of the features described above, or as an alternative to any of the foregoing embodiments, the one or more features to support machining can include a hold-down point.

In addition to one or more of the features described above, or as an alternative to any of the foregoing embodiments, the hold-down point can be a bolt hole or flat region for clamping.

In addition to one or more of the features described above, or as an alternative to any of the foregoing embodiments, the support structure can include an encapsulation region that covers at least two surfaces of the bearing compartment to be exposed by machining as part of the removal of the support structure.

In addition to one or more of the features described above, or as an alternative to any of the foregoing embodiments, at least one of the one or more features can include a datum to provide a reference for machining or tooling plate positioning.

In addition to one or more of the features described above, or as an alternative to any of the foregoing embodiments, a sequence of the one or more features can be incorporated within the support structure such that at least one of the one or more features is revealed as the support structure is removed from the bearing compartment.

In addition to one or more of the features described above, or as an alternative to any of the foregoing embodiments, the support structure can include a lower portion that contacts with a first overhang region of a housing of the bearing compartment, and an upper portion that extends from the first overhang region to a second overhang region of the housing that is radially inward of the first overhang region.

According to an aspect, a method of manufacturing a support structure integrally formed with a bearing compartment is provided. The method includes additively manufacturing a lower portion of the support structure in contact with a first overhang region of a housing of the bearing compartment. The method also includes additively manufacturing an upper portion of the support structure that extends from the first overhang region to a second overhang region of the housing that is radially inward of the first overhang region. The support structure includes a plurality of vertical supports and horizontal supports with one or more features to support machining of the bearing compartment and removal of the support structure from the bearing compartment.

In addition to one or more of the features described above, or as an alternative to any of the foregoing embodiments, the method can include forming an encapsulation region that covers at least two surfaces of the bearing compartment to be exposed by machining as part of the removal of the support structure.

In addition to one or more of the features described above, or as an alternative to any of the foregoing embodiments, the method can include incorporating a datum into the support structure as at least one of the one or more features to provide a reference for machining or tooling plate positioning.

In addition to one or more of the features described above, or as an alternative to any of the foregoing embodiments, the method can include incorporating within the support structure a sequence of the one or more features such that at least one of the one or more features is revealed as the support structure is removed from the bearing compartment.

According to an aspect, a method of processing a support structure integrally formed with a bearing compartment is provided. The method includes positioning the support structure for machining of the bearing compartment using one or more features of the support structure, where the support structure includes a lower portion in contact with a first overhang region of a housing of the bearing compartment and an upper portion that extends from the first overhang region to a second overhang region of the housing that is radially inward of the first overhang region. The lower portion of the support structure is removed, and the upper portion of the support structure is removed.

In addition to one or more of the features described above, or as an alternative to any of the foregoing embodiments, the method of processing can include machining an encapsulation region to expose at least two surfaces of the bearing compartment covered by the support structure.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 8 is a flow diagram illustrating a method of processing a support structure integrally formed with a bearing compartment in accordance with embodiments.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
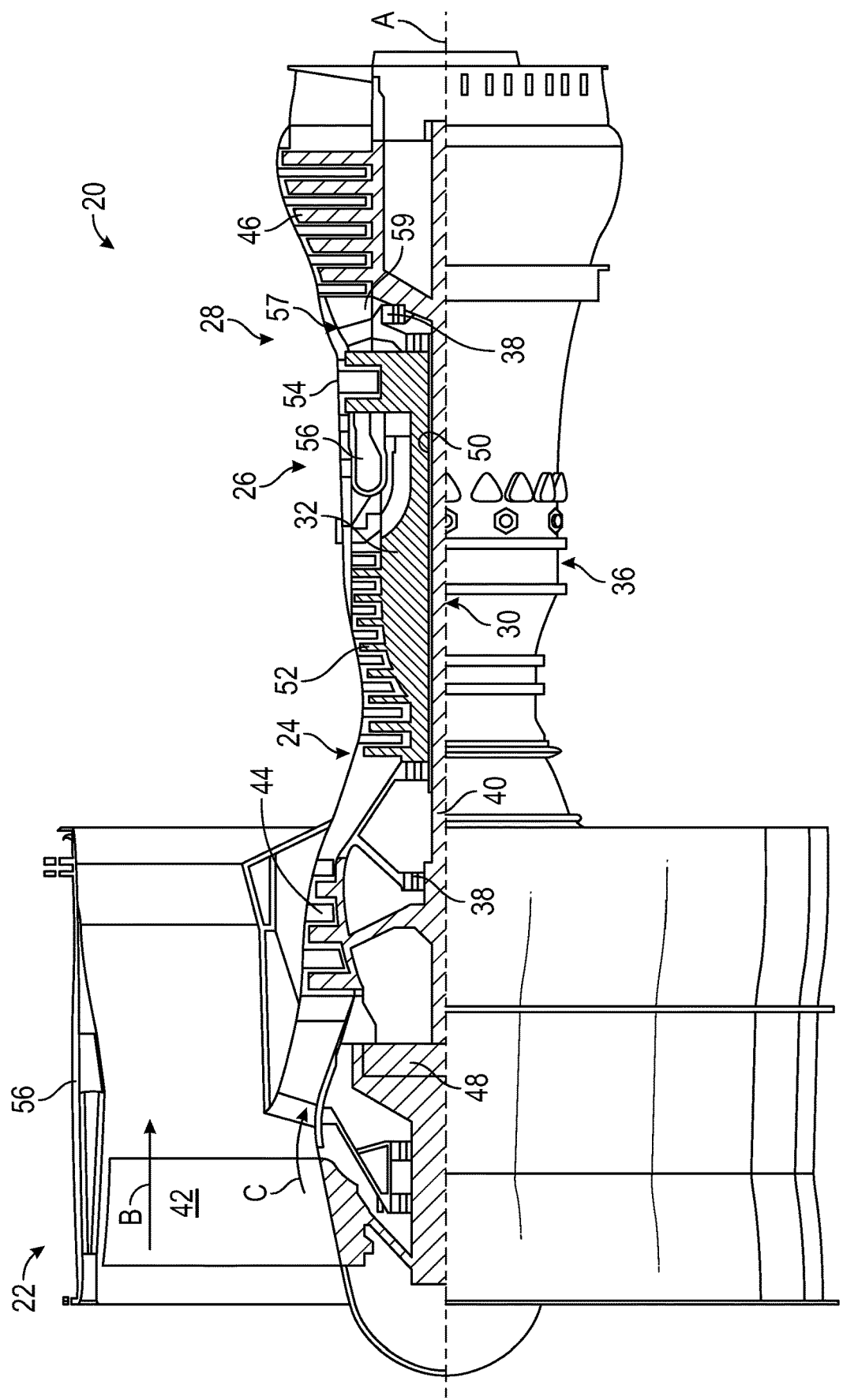
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7°\text{ R})]^{0.5}$. The "Low corrected fan tip speed" as disclosed herein according to one non-limiting embodiment is less than about 1150 ft/second (350.5 m/sec).

Figure 2:
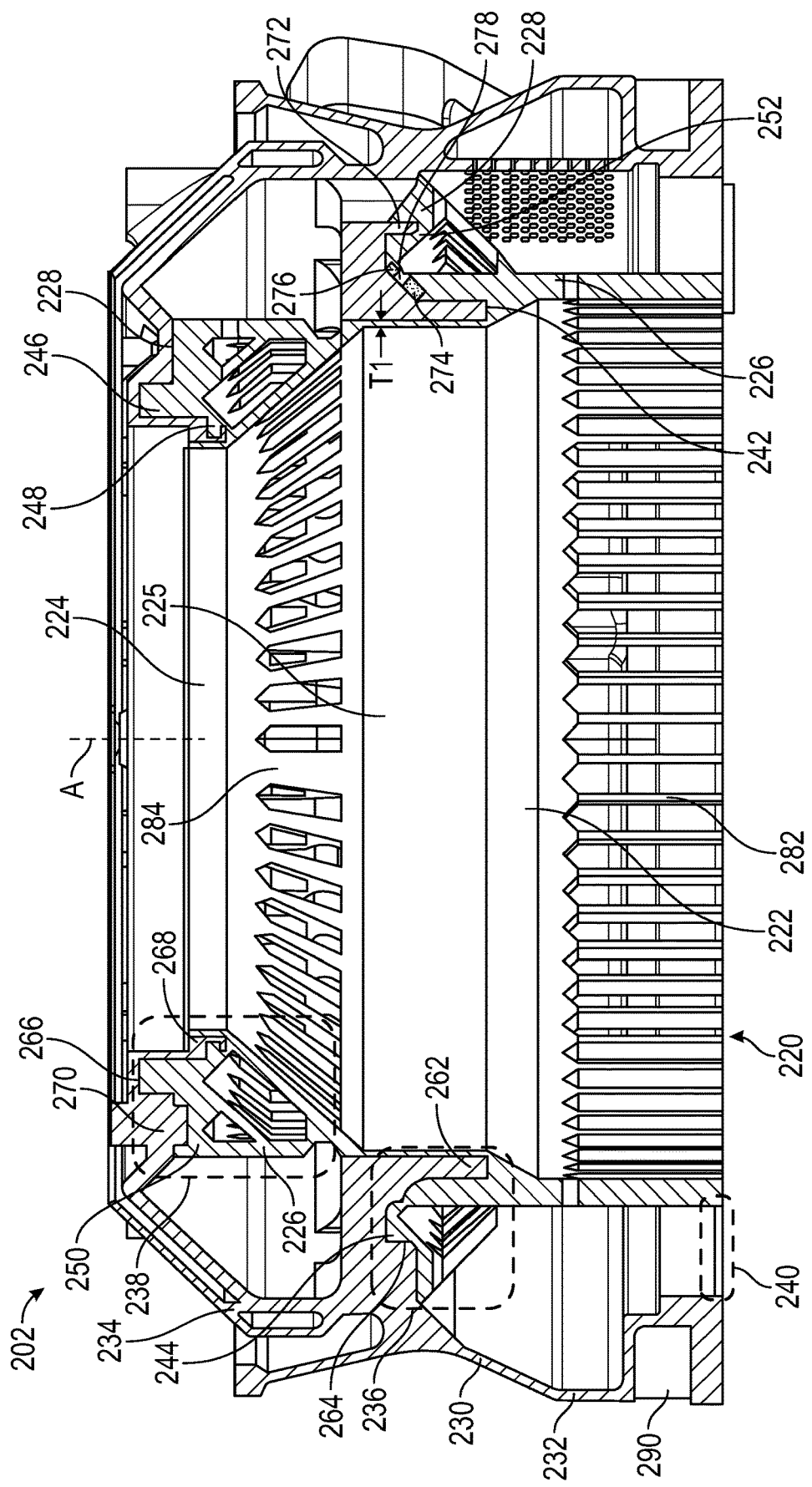
FIG. 2 is a side view of a bearing compartment with a support structure in accordance with embodiments.

With continued reference to FIG. 1 and with additional reference to FIGS. 2-6, a bearing compartment 202 of the gas turbine engine 20 of FIG. 1 can be additively manufactured and include a number of features with a complex geometry. The bearing compartment 202 can be part of the bearing systems 38 to support rotation of one or more shafts, such as the inner shaft 40 or the outer shaft 50. In the example of FIG. 2, the bearing compartment 202 includes a housing 230. The housing 230 can include a lower housing portion 232 and an upper housing portion 234. Rather than separately manufacturing the lower housing portion 232 and the upper housing portion 234, the housing 230 can be monolithically formed through an additive manufacturing process.

A first overhang region 236 that is supported by a support structure 220 during an additive manufacturing build process can be formed between the lower housing portion 232 and the upper housing portion 234. A second overhang region 238 of the upper housing portion 234 can be supported by the support structure 220 during the additive manufacturing build process. The support structure 220 can include a lower portion 222 in contact with the first overhang region 236 and an upper portion 224 that extends from the first overhang region 236 to the second overhang region 238 that is radially inward of the first overhang region 236. A sidewall support 225 connects the lower portion 222 to the upper portion 224 of the support structure 220. The bearing compartment 202 can be manufactured using a powder bed fusion process, e.g., laser or electron beam based, to progressively build the housing 230 from the lower housing portion 232 to the upper housing portion 234 while also building the support structure 220 within an interior of the housing 230. Forming the support structure 220 integrally with the housing 230 can enhance structural stability as vertical and horizontal support extends to multiple locations within the housing 230. Rather than using generalized supports, the support structure 220 can incorporate features that provide additional aspects beyond supporting the initial build process. The support structure 220 can include a plurality of vertical supports 226 and horizontal supports 228 with one or more features to support machining of the bearing compartment 202 and removal of the support structure 220 from the bearing compartment 202. Machining can include grinding, cutting, milling, polishing, and/or other such processes that remove material.

One example of the one or more features to support machining can include a hold-down point 240. The hold-down point 240 can be, for example, a bolt hole or flat region for clamping. The support structure 220 can also include multiple encapsulation region, such as encapsulation regions 242, 244, 246, 248, 250, 252. The encapsulation regions 242-252 can cover multiple surfaces, such as at least two surfaces of the bearing compartment 202 to be exposed by machining as part of the removal of the support structure 220. For instance, surfaces of a first interface 262 can be exposed upon machining of the encapsulation region 242, surfaces of a second interface 264 can be exposed upon machining of the encapsulation region 244, surfaces of a third interface 266 can be exposed upon machining of the encapsulation region 246, surfaces of a fourth interface 268 can be exposed upon machining of the encapsulation region 248, surfaces of a fifth interface 270 can be exposed upon machining of the encapsulation region 250, and surfaces of a sixth interface 272 can be exposed upon machining of the encapsulation region 252. The encapsulation regions 242-252 can wrap around surfaces, such as for interfaces 262, 268, 270, 272 or may fill gaps between surfaces, such as for interfaces 264, 266.

As another example of the one or more features to support machining, at least one of the one or more features can include a datum 274 to provide a reference for machining or tooling plate positioning. The datum 274 can be, for example, a portion of the support structure 220 having a change in internal characteristics, such as an internal lattice structure or gaps that become visible as material is removed. Further, the datum 274 can be a surface variation where a flat surface is incorporated on a larger curved surface. Further, the datum 274 can include a marking that is externally visible or becomes visible as material is removed from the support structure 220. The datum 274 can be part of a sequence of the one or more features incorporated within the support structure 220 such that at least one of the one or more features is revealed as the support structure 220 is removed from the bearing compartment 202. For instance, the datum 274 can be revealed as the encapsulation region 242 is machined away, and another feature 276 within the encapsulation region 244 can be revealed to assist in identifying where corner 278 should be formed.

The lower portion 222 of the support structure 220 can include a plurality of struts 282 that extend axially within the housing 230. The struts 282 can form a portion of the vertical supports 226. The struts 282 can extend axially in parallel to an axis of rotation (e.g., engine central longitudinal axis A) defined within a central cavity of the bearing compartment 202. The upper portion 224 of the support structure 220 can include a plurality of struts 284 that provide an inner support for the vertical supports 226 and horizontal supports 228 of the upper housing portion 234.

Other support structures can also be incorporated into the housing 230. For example, an outer support structure 290 can be integrally formed at an outer diameter of the housing 230. The outer support structure 290 may also include one or more features to support machining of the bearing compartment 202. For example, the outer support structure 290 may provide a clamping location to hold the bearing compartment 202 during processing to avoid damaging the remaining surfaces of the housing 230.

Figure 3:
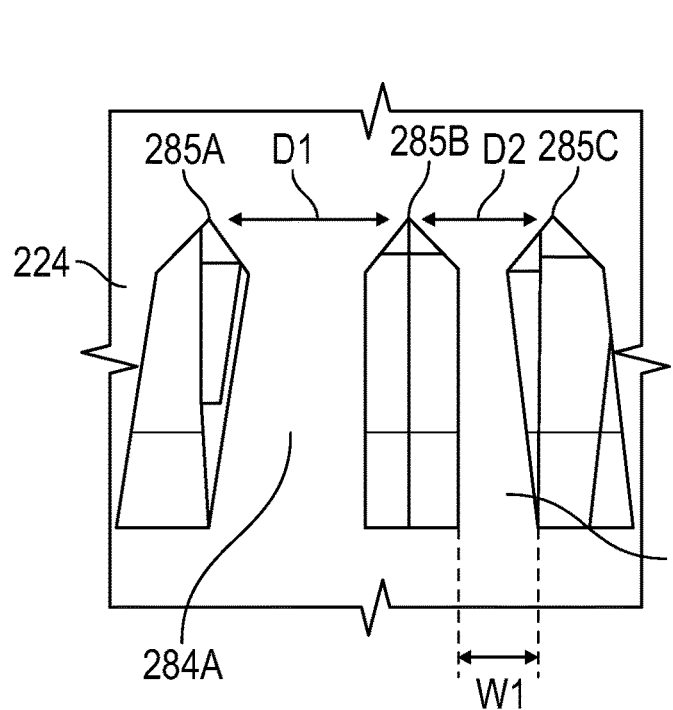
FIG. 3 is an enlarged view of a portion of FIG. 2 including an upper portion of the support structure in accordance with embodiments.
Figure 4:
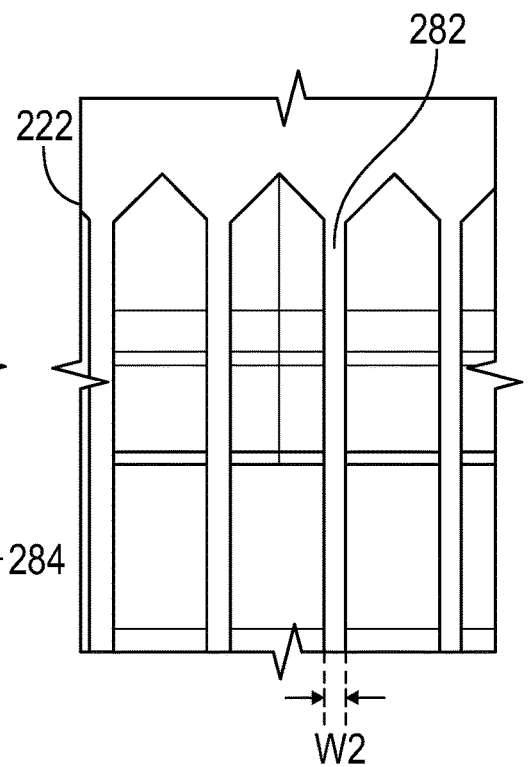
FIG. 4 is an enlarged view of a portion of FIG. 2 including a lower portion of the support structure in accordance with embodiments.
Figure 5:
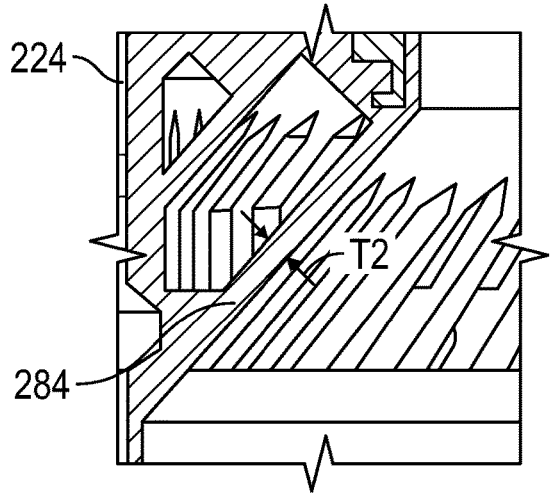
FIG. 5 is an enlarged view of a portion of FIG. 2 including the upper portion of the support structure in accordance with embodiments.
Figure 6:
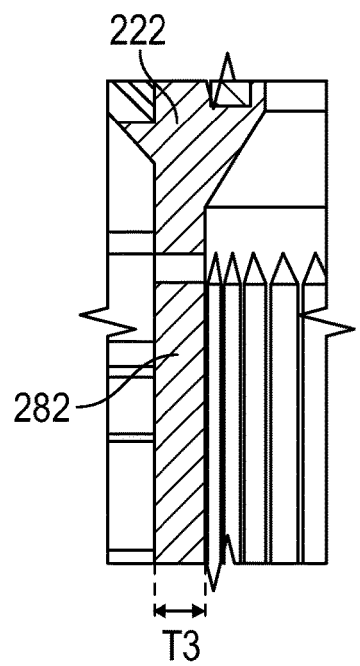
FIG. 6 is an enlarged view of a portion of FIG. 2 including the lower portion of the support structure in accordance with embodiments.

FIGS. 3 and 5 are enlarged views of portions of FIG. 2 including the upper portion 224 of the support structure 220 in accordance with embodiments. FIGS. 4 and 6 are enlarged views of portions of FIG. 2 including the lower portion 222 of the support structure 220 in accordance with embodiments. Peak locations 285 between struts 284 of the upper portion 224 can serve as features to identify specific locations. For instance, the spacing between the peak locations 285 may not be uniform. A reference strut 284A can be defined between peak 285A and peak 285B. The reference strut 284A may have a larger width than a width W1 of a strut 284 defined between peaks 285B and 285C. Thus, a distance D1 between peaks 285A and 285B is greater than a distance D2 between peaks 285B and 285C. The width W1 can be greater than a width W2 of struts 282 of the lower portion 222. Further, a thickness T1 (FIG. 2) of sidewall support 225 can be less than a thickness T2 of strut 284 of the upper portion 224. Further, a thickness T3 of strut 282 of the lower portion 222 can be greater than thickness T2. The thicknesses T1, T2, T3 and other dimensions of the support structure 220 can be selected to handle thermal conditions that may exist during the initial build or subsequent machining processes.

Figure 7:
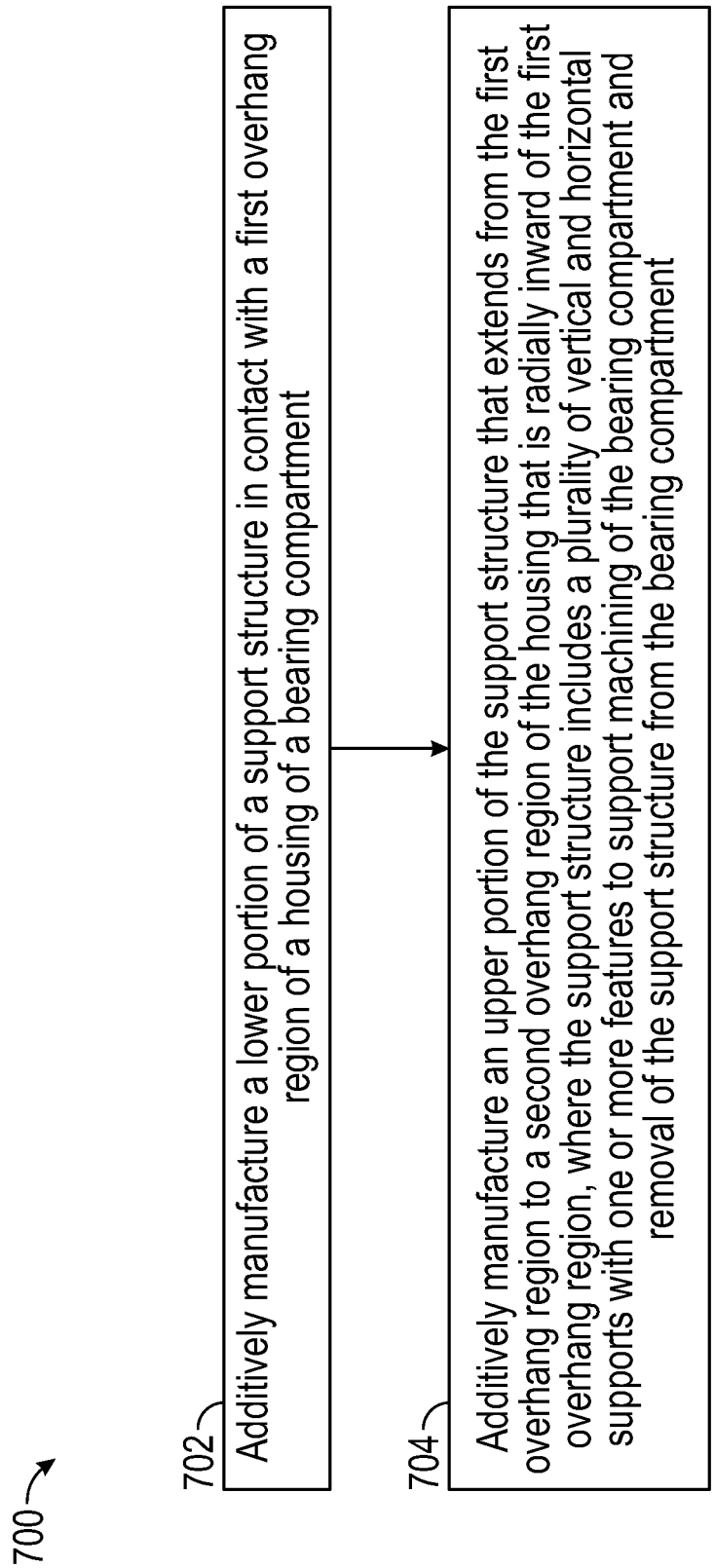
FIG. 7 is a flow diagram illustrating a method of manufacturing a support structure integrally formed with a bearing compartment in accordance with embodiments.

With reference to FIG. 7, a method 700 of manufacturing a support structure 220 integrally formed with a bearing compartment 202 is provided. The method 700 is described with reference to FIGS. 1-7 and can include additional steps beyond those depicted in FIG. 7. At block 702, the method 700 includes additively manufacturing a lower portion 222 of the support structure 220 in contact with a first overhang region 236 of a housing 230 of the bearing compartment 202. At block 704, the method 700 includes additively manufacturing an upper portion 224 of the support structure 220 that extends from the first overhang region 236 to a second overhang region 238 of the housing 230 that is radially inward of the first overhang region 236. The support structure 220 can include a plurality of vertical supports 226 and horizontal supports 228 with one or more features to support machining of the bearing compartment 202 and removal of the support structure 220 from the bearing compartment 202.

In some embodiments, the one or more features to support machining include a hold-down point 240. The hold-down point 240 can be a bolt hole or flat region for clamping, for example. The method 700 can also include forming an encapsulation region that covers at least two surfaces of the bearing compartment 202 to be exposed by machining as part of the removal of the support structure 220, such as encapsulation regions 242-252. The method 700 can also include incorporating a datum 274 into the support structure 220 as at least one of the one or more features to provide a reference for machining or tooling plate positioning. The method 700 can also include incorporating within the support structure 220 a sequence of the one or more features such that at least one of the one or more features is revealed as the support structure 220 is removed from the bearing compartment 202, such as feature 276 that may be revealed after datum 274 during the material removal process.

With reference to FIG. 8, a method 800 of processing a support structure 220 integrally formed with a bearing compartment 202 is provided. The method 800 is described with reference to FIGS. 1-8 and can include additional steps beyond those depicted in FIG. 8. The method 800 can be performed in conjunction with the method 700 of FIG. 7. At block 802, the method 800 includes positioning the support structure 220 for machining of the bearing compartment 202 using one or more features of the support structure 220. The support structure 220 can include a lower portion 222 in contact with a first overhang region 236 of a housing 230 of the bearing compartment 202 and an upper portion 224 that extends from the first overhang region 236 to a second overhang region 238 of the housing 230 that is radially inward of the first overhang region 236. At block 804, the lower portion 222 of the support structure 220 is removed. At block 806, the upper portion 224 of the support structure 220 is removed. The method 800 can include machining an encapsulation region to expose at least two surfaces of the bearing compartment 202 covered by the support structure 220, such as encapsulation regions 242-252.

Benefits of the features described herein include a support structure integrally formed with a bearing compartment through the use of additive manufacturing that allows for complex geometries. Features incorporated into the support structure can provide positioning reference points, hold-downs, and define processing sequences to reduce the post-processing burdens and risk of component damage during the machining process.

The term "about" is intended to include the degree of error associated with measurement of the particular quantity based upon the equipment available at the time of filing the application. Terms such as "upper" and "lower" are used for purposes of explanation and the designation as such can be altered depending upon component orientation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A support structure integrally formed with a bearing compartment of a gas turbine engine, the support structure comprising:
   a plurality of vertical supports and horizontal supports comprising one or more features to support machining of the bearing compartment and removal of the support structure from the bearing compartment prior to installation of the bearing compartment in the gas turbine engine;
   a lower portion that contacts with a first overhang region of a housing of the bearing compartment;
   an upper portion that extends from the first overhang region to a second overhang region of the housing that is radially inward of the first overhang region; and
   a sidewall support that extends axially between the lower portion and the upper portion, wherein the sidewall support connects the lower portion to the upper portion.

2. The support structure of claim 1, wherein the one or more features to support machining comprise a hold-down point.

3. The support structure of claim 2, wherein the hold-down point is a bolt hole or flat region for clamping.

4. The support structure of claim 1, further comprising an encapsulation region that covers at least two surfaces of the bearing compartment to be exposed by machining as part of the removal of the support structure.

5. The support structure of claim 1, wherein at least one of the one or more features comprises a datum to provide a reference for machining or tooling plate positioning.

6. The support structure of claim 5, wherein a sequence of the one or more features is incorporated within the support structure such that at least one of the one or more features is revealed as the support structure is removed from the bearing compartment.

7. The support structure of claim 1, wherein the vertical supports of the upper portion comprise a plurality of struts with a reference strut having a different width than other struts of the plurality of struts of the upper portion.

8. A method of manufacturing a support structure integrally formed with a bearing compartment of a gas turbine engine, the method comprising:
    additively manufacturing a lower portion of the support structure in contact with a first overhang region of a housing of the bearing compartment;
    additively manufacturing an upper portion of the support structure that extends from the first overhang region to a second overhang region of the housing that is radially inward of the first overhang region, wherein the support structure comprises a plurality of vertical supports and horizontal supports with one or more features to support machining of the bearing compartment and removal of the support structure from the bearing compartment prior to installation of the bearing compartment in the gas turbine engine;
    additively manufacturing a sidewall support that extends axially between the lower portion and the upper portion, wherein the sidewall support connects the lower portion to the upper portion; and
    machining the bearing compartment to remove the support structure from the bearing compartment prior to installation of the bearing compartment in the gas turbine engine, wherein the machining comprises one or more of: grinding, cutting, and milling that removes material of the support structure from the bearing compartment.

9. The method of claim 8, wherein the one or more features to support machining comprise a hold-down point.

10. The method of claim 9, wherein the hold-down point is a bolt hole or flat region for clamping.

11. The method of claim 8, further comprising:
    forming an encapsulation region that covers at least two surfaces of the bearing compartment to be exposed by machining as part of the removal of the support structure.

12. The method of claim 8, further comprising:
    incorporating a datum into the support structure as at least one of the one or more features to provide a reference for machining or tooling plate positioning.

13. The method of claim 12, further comprising:
    incorporating within the support structure a sequence of the one or more features such that at least one of the one or more features is revealed as the support structure is removed from the bearing compartment.

14. A method of processing a support structure integrally formed with a bearing compartment of a gas turbine engine, the method comprising:
    positioning the support structure for machining of the bearing compartment using one or more features of the support structure, wherein the support structure comprises a lower portion in contact with a first overhang region of a housing of the bearing compartment, an upper portion that extends from the first overhang region to a second overhang region of the housing that is radially inward of the first overhang region, and a sidewall support that extends axially between the lower portion and the upper portion, wherein the sidewall support connects the lower portion to the upper portion;
    removing the lower portion of the support structure prior to installation of the bearing compartment in the gas turbine engine, wherein removing the lower portion of the support structure comprises one or more of: grinding, cutting, and milling that removes material of the lower portion of the support structure from the bearing compartment; and
    removing the upper portion of the support structure prior to installation of the bearing compartment in the gas turbine engine,
        wherein removing the upper portion of the support structure comprises one or more of: grinding, cutting, and milling that removes material of the upper portion of the support structure from the bearing compartment.

15. The method of claim 14, wherein the support structure comprises a plurality of vertical supports and horizontal supports comprising the one or more features to support machining of the bearing compartment and removal of the support structure from the bearing compartment.

16. The method of claim 15, wherein the one or more features to support machining comprise a hold-down point.

17. The method of claim 16, wherein the hold-down point is a bolt hole or flat region for clamping.

18. The method of claim 14, further comprising:
    machining an encapsulation region to expose at least two surfaces of the bearing compartment covered by the support structure.

19. The method of claim 14, wherein at least one of the one or more features comprises a datum to provide a reference for machining or tooling plate positioning.

20. The method of claim 19, wherein a sequence of the one or more features is incorporated within the support structure such that at least one of the one or more features is revealed as the support structure is removed from the bearing compartment.

\* \* \* \* \*